(12) United States Patent
Yamakawa

(10) Patent No.: US 10,684,263 B2
(45) Date of Patent: Jun. 16, 2020

(54) CHROMATOGRAM DATA PROCESSING DEVICE AND PROGRAM

(71) Applicant: SHIMADZU CORPORATION, Kyoto-shi, Kyoto (JP)

(72) Inventor: Momoyo Yamakawa, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 227 days.

(21) Appl. No.: 15/575,116

(22) PCT Filed: May 19, 2015

(86) PCT No.: PCT/JP2015/064251
§ 371 (c)(1),
(2) Date: Nov. 17, 2017

(87) PCT Pub. No.: WO2016/185552
PCT Pub. Date: Nov. 24, 2016

(65) Prior Publication Data
US 2018/0149628 A1 May 31, 2018

(51) Int. Cl.
*G01N 30/86* (2006.01)
(52) U.S. Cl.
CPC ......... *G01N 30/8637* (2013.01); *G01N 30/86* (2013.01); *G01N 30/8651* (2013.01)
(58) Field of Classification Search
CPC . G01N 30/86; G01N 30/8637; G01N 30/8651
(Continued)

(56) References Cited

U.S. PATENT DOCUMENTS 5,121,443 A * 6/1992 Tomlinson ......... G01N 30/8624
        210/656
9,797,929 B2 * 10/2017 Nakayama ......... G01R 13/0245

FOREIGN PATENT DOCUMENTS

| JP | 2006-047280 A | 2/2006 |
| JP | 2011-257206 A | 12/2011 |
| JP | 2014-134385 A | 7/2014 |

OTHER PUBLICATIONS

Written Opinion dated Aug. 11, 2015 in application No. PCT/JP2015/064251.
(Continued)

*Primary Examiner* — John H Le
(74) *Attorney, Agent, or Firm* — Sughrue Mion, PLLC

(57) ABSTRACT

A device including a chromatogram display section; a peak-specifying point detector automatically detecting a peak-beginning point on a displayed chromatogram; a peak-specifying point indicator allowing an operator to indicate, as the point in time of a peak-ending point, a point in time on a time axis of an orthogonal coordinate system; a peak-specifying-point candidate designator designating a point at which a straight line extending parallel to the intensity axis and passing through the point in time of the peak-ending point indicated by the peak-specifying point indicator intersects with the chromatogram and a point at which a straight line extending parallel to the time axis and passing through the peak-beginning point detected by the peak-specifying point detector intersects with the straight line extending parallel to the intensity axis and passing through the point in time of the peak-ending point; and a peak-specifying point selector allowing an operator to select either point.

10 Claims, 3 Drawing Sheets

(58) Field of Classification Search
USPC .............. 702/23, 25, 89; 382/156; 73/61.52
See application file for complete search history.

(56) References Cited

OTHER PUBLICATIONS

International Search Report for PCT/JP2015/064251 dated Aug. 11, 2015 [PCT/ISA/210].

* cited by examiner

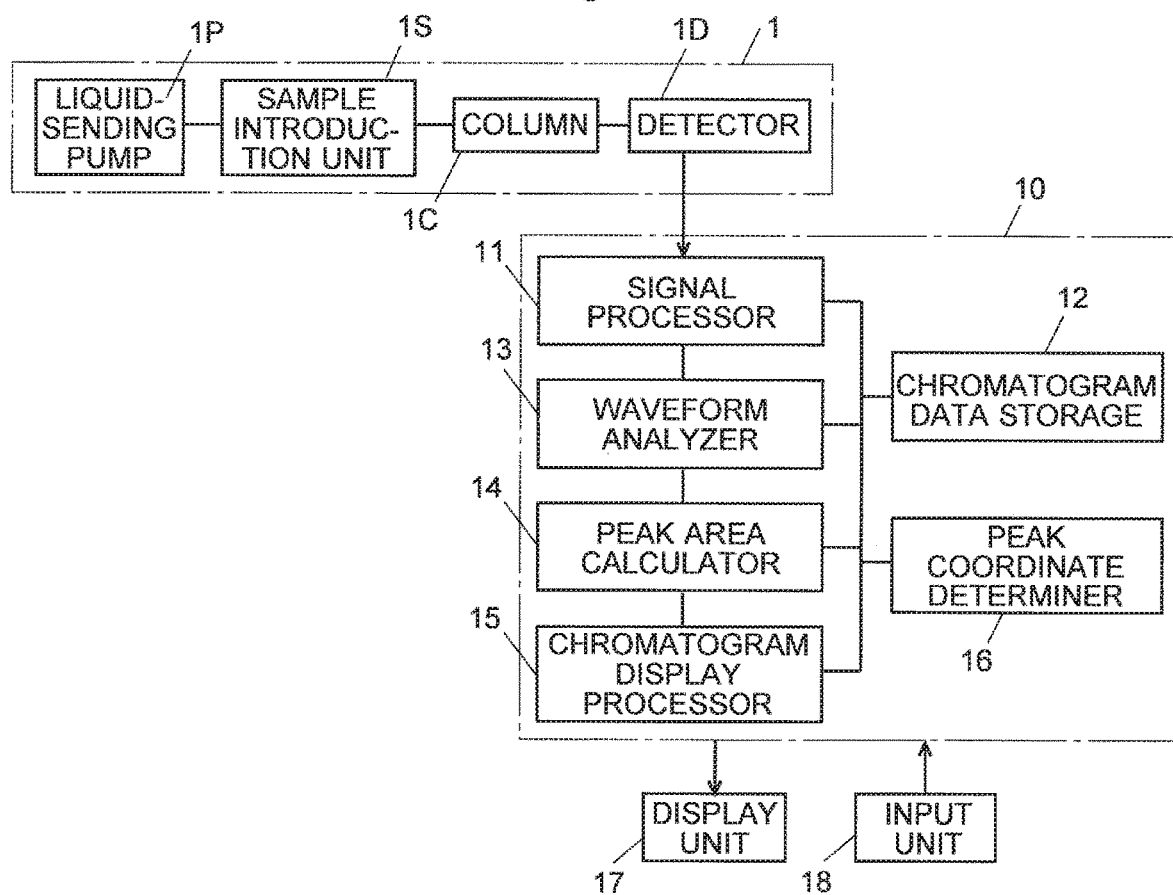

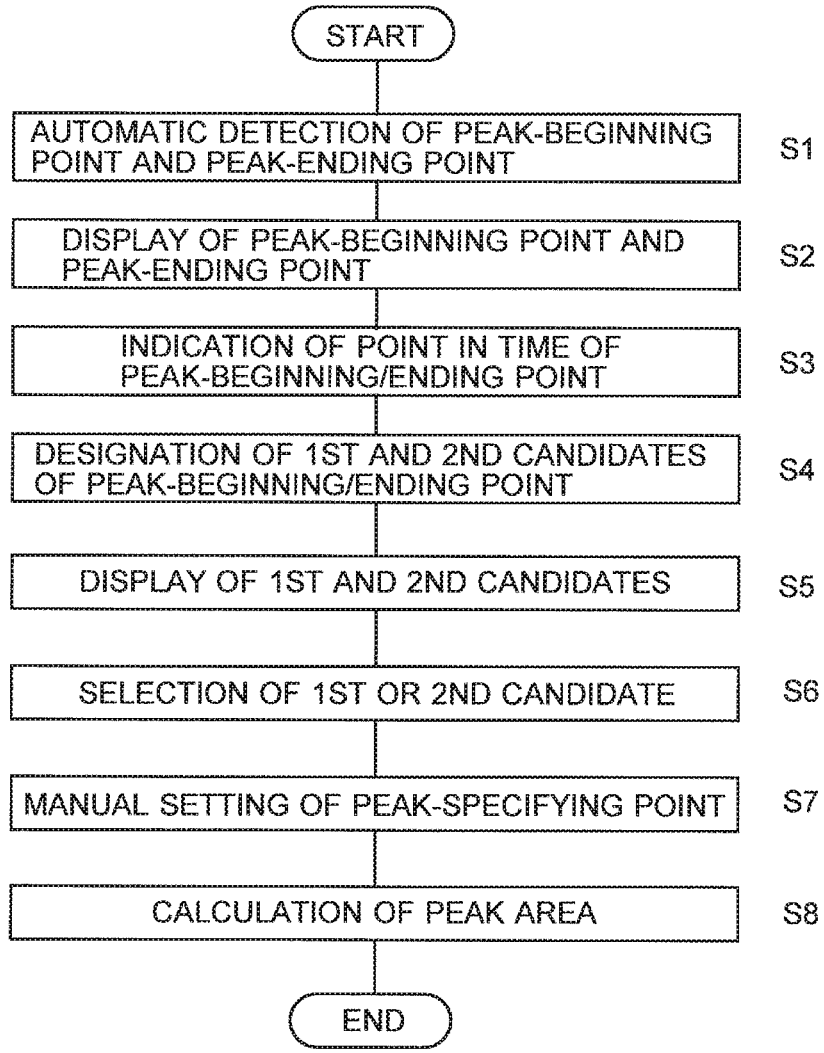
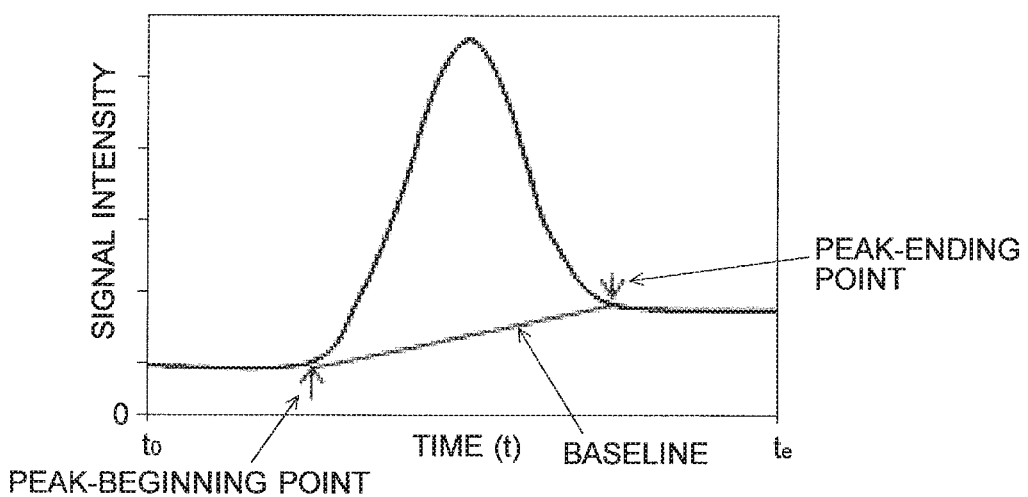

CHROMATOGRAM DATA PROCESSING DEVICE AND PROGRAM

CROSS REFERENCE TO RELATED APPLICATIONS

This application is a National Stage of International Application No. PCT/JP2015/064251, filed on May 19, 2015, the contents of all of which are incorporated herein by reference in their entirety.

TECHNICAL FIELD

The present invention relates to a device and method for processing data of various kinds of chromatograms, such as a chromatogram obtained with a gas chromatograph (GC) or liquid chromatograph (LC) as well as a mass chromatogram or total ion chromatogram obtained with a gas chromatograph mass spectrometer (GC/MS) or liquid chromatograph mass spectrometer (LC/MS).

BACKGROUND ART

In a chromatograph, such as a GC or LC, sample components which have been temporally separated by a column are detected with an ultraviolet visible spectrometer or similar detector, and a chromatogram showing a temporal change in the signal intensity is created based on the detection signals.

In order to perform a qualitative or quantitative analysis of various components contained in a sample, it is necessary to locate a peak included in the obtained chromatogram. Normally, the peak is automatically detected from the chromatogram by an automatic detection algorithm (for example, see Patent Literature 1).

However, performing an automatic detection of a peak is not always appropriate. For example, if a plurality of components overlapping each other at close points in time are eluted from the column, a plurality of peaks overlapping each other appear on the chromatogram. In such a case, it is impossible to accurately detect each individual peak since the beginning or ending point of each peak is unclear. Besides, if the amount of target component is much smaller than those of the other components, the peak of the target component will be obscured by other peaks and the detection accuracy of that peak will be lowered. Furthermore, in the case of a temperature-programmed analysis in which the column temperature is gradually increased, or a gradient analysis in which the analysis is performed using a mixture of mobile phases with their mixture ratio gradually changed, the baseline of the chromatogram changes with the passage of time (i.e. drift of the baseline occurs), making it difficult to accurately detect the peak by automatic detection. Accordingly, conventional devices have the function of allowing operators to manually enter the peak-beginning point, peak-ending point and/or similar information for locating the peak position, to enable the detection of the peak (and baseline).

CITATION LIST

Patent Literature

Patent Literature 1: JP 2011-257206 A

SUMMARY OF INVENTION

Technical Problem

In the manual detection of a peak, for example, the operator indicates the beginning and ending points of the peak on a screen on which a chromatogram is displayed, using a mouse or other input means. By this operation, a peak whose baseline lies on the straight line that connects the peak-beginning and peak-ending points is detected.

In the case of analyzing a plurality of samples, the task of manually specifying the beginning and ending points must be performed for each sample (i.e. every time a chromatogram is created) as well as for each peak (i.e. for each component). If there are a large number of samples to be analyzed, the operator needs to consume a considerable amount of time and labor to perform a large amount of manual operations. Besides, in normal analyses, the beginning and ending points of a peak are both located either on the chromatogram, or they are positioned in such a manner that a straight line which connects the peak-beginning and peak-ending points becomes parallel to the time axis. Specifying the peak-beginning and ending points so as to satisfy such relationships is not easy since it requires fine operations using a mouse.

The problem to be solved by the present invention is to provide a chromatogram data processing device and program with which an operation for specifying a peak and/or baseline on a chromatogram can be easily and efficiently performed.

Solution to Problem

A chromatogram data processing device according to the present invention developed for solving the previously described problem includes:

a) a chromatogram display section for displaying a chromatogram on an orthogonal coordinate system formed by a time axis and an intensity axis;

b) a peak-specifying point detector for detecting, based on a predetermined criterion, a peak-beginning point on the chromatogram displayed on the orthogonal coordinate system;

c) a peak-specifying point indicator for allowing an operator to indicate the point in time of a peak-ending point on the time axis of the orthogonal coordinate system;

d) a peak-specifying-point candidate designator for designating, as a first candidate and a second candidate of the peak-ending point, a point at which a straight line extending parallel to the intensity axis and passing through the point in time of the peak-ending point indicated by the operator intersects with the chromatogram, and a point at which a straight line extending parallel to the time axis and passing through the peak-beginning point detected by the peak-specifying point detector intersects with the straight line extending parallel to the intensity axis and passing through the point in time of the peak-ending point; and e) a peak-specifying point selector for allowing an operator to select either the first candidate or the second candidate as the peak-ending point.

Another chromatogram data processing device according to the present invention developed for solving the previously described problem includes:

a) a chromatogram display section for displaying a chromatogram on an orthogonal coordinate system formed by a time axis and an intensity axis;

b) a peak-specifying point detector for detecting, based on a predetermined criterion, a peak-ending point on the chromatogram displayed on the orthogonal coordinate system;

c) a peak-specifying point indicator for allowing an operator to indicate the point in time of a peak-beginning point on the time axis of the orthogonal coordinate system;

d) a peak-specifying-point candidate designator for designating, as a first candidate and a second candidate of the peak-beginning point, a point at which a straight line extending parallel to the intensity axis and passing through the point in time of the peak-beginning point indicated by the operator intersects with the chromatogram, and a point at which a straight line extending parallel to the time axis and passing through the peak-ending point detected by the peak-specifying point detector intersects with the straight line extending parallel to the intensity axis and passing through the point in time of the peak-beginning point; and e) a peak-specifying point selector for allowing an operator to select either the first candidate or the second candidate as the peak-beginning point.

In the chromatogram data processing device according to the present invention, when a point in time on the time axis of the orthogonal coordinate system is indicated by an operator, the peak-specifying-point candidate designator designates two points as candidates (first and second candidates) of the peak-beginning point or peak-ending point of the chromatogram displayed on the orthogonal coordinate system, based on the indicated point in time as well as the peak-ending point or peak-beginning point detected by the peak-specifying point detector. When one of the two points designated as the first and second candidates is detected by the operator, the selected point is fixed as the peak-beginning point or peak-ending point.

The peak-specifying point detector may be configured to automatically detect both peak-beginning and peak-ending points from the chromatogram displayed on the orthogonal coordinate system. In this case, if either the peak-beginning or peak-ending point automatically detected is inappropriate, the operator manually sets a point for the inappropriate one by the previously described method. By this operation, the peak-specifying point automatically detected by the peak-specifying point detector is replaced by the peak-specifying point manually set by the operator.

In the chromatogram data processing device according to the present invention, the peak-specifying point selector may be configured to allow an operator to select, as the peak-ending point or peak-beginning point, a point on the straight line passing through the first candidate and the second candidate, or a point within a section between the first candidate and the second candidate on the straight line. In this case, it is preferable to provide a mode for selecting a point on the straight line as well as a mode for selecting a point within the section between the first candidate and the second candidate on the straight line, and to allow the operator to select one of these modes. This configuration provides a broader range for selecting the peak-ending or peak-beginning point, so that a more appropriate peak-specifying point can be set.

The chromatogram data processing device according to the present invention may preferably include a peak area calculator for calculating a peak area of the chromatogram displayed on the orthogonal coordinate system, based on the peak-beginning point and the peak-ending point determined by the peak-specifying point detector and the peak-specifying point selector, and for displaying the peak area on the chromatogram display section.

A chromatogram data processing program according to the present invention is a program for making a computer execute the following steps:

a) a chromatogram display step, in which a chromatogram is displayed on an orthogonal coordinate system formed by a time axis and an intensity axis;

b) a peak-specifying point detection step, in which a peak-beginning point on the chromatogram displayed on the orthogonal coordinate system is detected based on a predetermined criterion;

c) a peak-specifying point setting step, in which a point in time of a peak-ending point is set on the time axis of the orthogonal coordinate system based on an input by an operator;

d) a peak-specifying-point candidate designation step, in which a point at which a straight line extending parallel to the intensity axis and passing through the point in time of the peak-ending point intersects with the chromatogram, and a point at which a straight line extending parallel to the time axis and passing through the peak-beginning point intersects with the straight line extending parallel to the intensity axis and passing through the point in time of the peak-ending point, are respectively designated as a first candidate and a second candidate of the peak-ending point; and e) a peak-ending point fixation step, in which either the first candidate or the second candidate is fixed as the peak-ending point, based on an input by an operator.

Another chromatogram data processing program according to the present invention is a program for making a computer execute the following steps:

a) a chromatogram display step, in which a chromatogram is displayed on an orthogonal coordinate system formed by a time axis and an intensity axis;

b) a peak-specifying point detection step, in which a peak-ending point on the chromatogram displayed on the orthogonal coordinate system is detected based on a predetermined criterion;

c) a peak-specifying point setting step, in which a point in time of a peak-beginning point is set on the time axis of the orthogonal coordinate system based on an input by an operator;

d) a peak-specifying-point candidate designation step, in which a point at which a straight line extending parallel to the intensity axis and passing through the point in time of the peak-beginning point intersects with the chromatogram, and a point at which a straight line extending parallel to the time axis and passing through the peak-ending point intersects with the straight line extending parallel to the intensity axis and passing through the point in time of the peak-beginning point, are respectively designated as a first candidate and a second candidate of the peak-beginning point; and e) a peak-beginning point fixation step, in which either the first candidate or the second candidate is fixed as the peak-beginning point, based on an input by an operator.

Advantageous Effects of the Invention

In the chromatogram data processing device and program according to the present invention, when an operator indicates a point on the time axis of an orthogonal coordinate system formed by a time axis and an intensity axis, a peak-beginning point or peak-ending point of a chromatogram displayed on the orthogonal coordinate system is set. Accordingly, the operation for manually setting a peak or baseline of the chromatogram can be easily and efficiently performed.

BRIEF DESCRIPTION OF DRAWINGS

FIG. 1 is a schematic configuration diagram showing one embodiment of the chromatogram data processing device according to the present invention.

FIG. 2 is a flowchart showing an operation of the chromatogram data processing device in the present embodiment.

FIG. 3 is a diagram showing an example of the chromatogram displayed on an orthogonal coordinate system formed by a time axis and an intensity axis in the chromatogram data processing device according to the present embodiment, with an automatically detected peak-specifying point and baseline displayed on it.

DESCRIPTION OF EMBODIMENTS

Figure 4A:
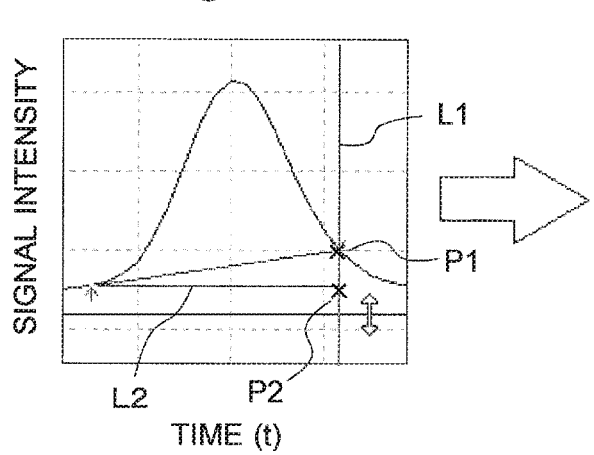
FIGS. 4A-4C are diagrams showing an example of the display screen for manually setting a peak-specifying point on a chromatogram displayed on an orthogonal coordinate system formed by a time axis and an intensity axis in the chromatogram data processing device according to the present embodiment.

An embodiment of the chromatogram data processing device and program according to the present invention is hereinafter described using FIGS. 1-5.

FIG. 1 is a block diagram showing the configuration of the main components of a chromatogram data processing device 10 according to the present embodiment. In a chromatograph 1, a solvent (mobile phase) drawn by a liquid-sending pump 1P is passed through a sample introduction unit 1S into a column 1C at a fixed flow rate. In the sample introduction unit 1S, a sample solution is injected into the mobile phase at a predetermined timing. The injected sample solution is carried by the mobile phase into the column 1C. While passing through the column 1C, the solution is separated into components, which exit from the column. A detector 1D sequentially detects the components coming from the column and sends detection signals to the chromatogram data processing device 10.

In the chromatogram data processing device 10, the detection signals received from the detector 1D of the chromatograph 1 are fed to a signal processor 11. The signal processor 11 creates chromatogram data based on the detection signals and stores the data in a chromatogram data storage section 12. The obtained chromatogram data have an intensity distribution along the time axis, since the components contained in the sample arriving at the detector 1D are temporally separated due to the action of the column 1C. The chromatogram data storage section 12 is created using a hard disk, flash memory or similar record medium. Instead of directly holding the chromatogram data, the chromatogram data storage section 12 may hold data of the signals representing mass spectra, absorbance spectra or the like which are produced by the detector 1D and used as the data from which the chromatogram data are created.

A chromatogram display processor 15 creates data for displaying a chromatogram on an orthogonal coordinate system with the horizontal axis indicating time and the vertical axis indicating intensity based on the chromatogram data stored in the chromatogram data storage section 12.

Based on predetermined parameters, a waveform analyzer 13 detects a peak-beginning point and a peak-ending point on a chromatogram from the chromatogram data created by the signal processor 11 or from the data for displaying the chromatogram created by the chromatogram display processor 15. A peak area calculator 14 computes a peak area based on the information of the peak-beginning point and the peak-ending point detected by the waveform analyzer 13 or based on the information of the peak-beginning point and the peak-ending point indicated by an operator. The operation for allowing an operator to indicate the peak-beginning point and the peak-ending point will be described later.

The signal processor 11, waveform analyzer 13, peak area calculator 14, chromatogram display processor 15 and peak coordinate determiner 16 (which will be described later) are embodied by a CPU of a computer and a piece of software, and have specific functions as will be described later. The chromatogram data processing device 10 further includes a display unit 17 for displaying a chromatogram as well as an input unit 18 including a mouse, keyboard and other devices used for the peak-specifying operation or other tasks performed by an operator.

A procedure for processing chromatogram data by the chromatogram data processing device 10 in the present embodiment is hereinafter described with reference to FIGS. 2-5. The chromatogram data storage section 12 holds chromatogram data for one or more samples. Those data are previously obtained by the chromatograph 1 before the operation by the chromatogram data processing device 10 is initiated. When a predetermined operation is performed by an operator using the input unit 18, the chromatogram display processor 15 reads the data from the chromatogram data storage section 12. Then, it creates an orthogonal coordinate system and a chromatogram, with the horizontal axis indicating time and the vertical axis indicating intensity, and displays the chromatogram on the screen of the display unit 17.

In this state, when the operator using the input unit 18 performs a predetermined operation for initiating a process for manually setting the peak-beginning and peak-ending points (these points may be hereinafter collectively called the "peak-specifying points"), the waveform analyzer 13 detects a peak-beginning/ending point of the chromatogram displayed on the screen of the display unit 17 (Step S1). Accordingly, in the present embodiment, the waveform analyzer 13 corresponds to the peak-specifying point detector. The waveform analyzer 13 may be configured to detect both peak-beginning and peak-ending points of the chromatogram, or to detect only one of them. Subsequently, the waveform analyzer 13 detects the baseline from the detected peak-beginning and peak-ending points. Then, it displays the peak-beginning point, peak-ending point and baseline on the orthogonal coordinate system on which the chromatogram is displayed (Step S2). FIG. 3 shows an example of the peak-beginning point, peak-ending point and baseline drawn on the orthogonal coordinate system on which the chromatogram is displayed.

Subsequently, the operator determines whether or not the peak-beginning point or peak-ending point automatically detected by the waveform analyzer 13 is appropriate, by visually examining the waveform of the chromatogram, inclination of the baseline and other features displayed on the screen of the display unit 17, or by considering the processing conditions in the chromatograph 1 and other factors. If the peak-beginning point or peak-ending point automatically detected by the waveform analyzer 13 is inappropriate, the operator should manually set the point in time of the peak-beginning point or peak-ending point on the time axis of the orthogonal coordinate system (Step S3).

The setting of the point in time of the peak-specifying point may be performed by various methods, e.g. by entering a numerical value representing the point in time using the keyboard, or clicking the mouse at an appropriate position on the orthogonal coordinate system displayed on the display unit 17 to set the time-axis coordinate of the clicked point as the point in time of the peak-specifying point. In the case of the operation using a mouse, it is preferable to differentiate between the setting of the peak-beginning point and that of the peak-ending point by combining the mouse operation with a key operation, e.g. by clicking a point on the orthogonal coordinate system with the mouse while pressing the "S" key on the keyboard when setting the peak-beginning point or the "E" key when setting the peak-ending point. As another possible example, when a point near the peak-beginning point or peak-ending point automatically detected by the waveform analyzer 13 is clicked with the mouse by the operator, the time-axis coordinate of the clicked point may be set as the point in time of the peak-specifying point which is located near the clicked point.

Based on the point indicated by the operator on the orthogonal coordinate system, the peak coordinate determiner 16 determines the straight line L1 passing through the indicated point and extending parallel to the intensity axis. It also designates, as the first candidate P1, the point at which the straight line L1 intersects with the chromatogram displayed on the orthogonal coordinate system. Furthermore, among the automatically detected peak-specifying points, the peak coordinate determiner 16 locates the peak-specifying point which is farther from the point indicated by the operator. Then, it determines the straight line L2 passing through this peak-specifying point and extending parallel to the time axis of the orthogonal coordinate system, and designates the point of intersection of the straight line L1 and the former straight line L2 as the second candidate P2 (Step S4). The straight line L1, first candidate P1 and second candidate P2 determined in this manner are all displayed on the orthogonal coordinate system by the chromatogram display processor 15 (Step S5). FIG. 4A shows one example of the straight line L1, first candidate P1 and second candidate P2 displayed on the orthogonal coordinate system in the case of manually setting the peak-ending point.

In this state, the operator selects either the first candidate P1 or the second candidate P2 by a predetermined operation (Step S6). Then, the peak coordinate determiner 16 fixes the candidate selected by the operator as the peak-ending point (Step S7). The selection of the first candidate P1 or the second candidate P2 can be made performed by various methods, e.g. by double-clicking the first candidate P1 or the second candidate P2 on the orthogonal coordinate system with the mouse, or by double-clicking an appropriate position near the first candidate P1 or the second candidate P2 with the mouse.

Figure 4B:
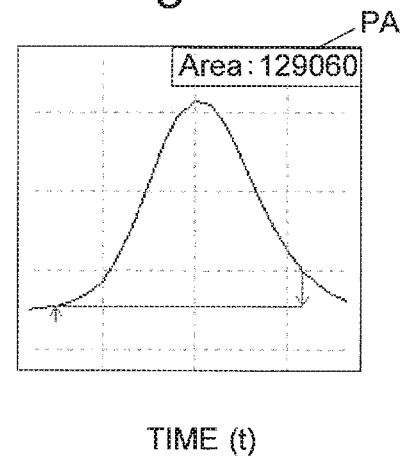

After the peak-specifying point is manually fixed in the previously described manner, the chromatogram display processor 15 displays the fixed peak-specifying point and the automatically detected peak-specifying point as well as a straight line connecting those peak-specifying points (baseline) on the orthogonal coordinate system (see FIG. 4B). At the same time, the peak area calculator 14 computes the peak area of the chromatogram based on the chromatogram data, peak-specifying points and baseline (Step S8).

Figure 4C:
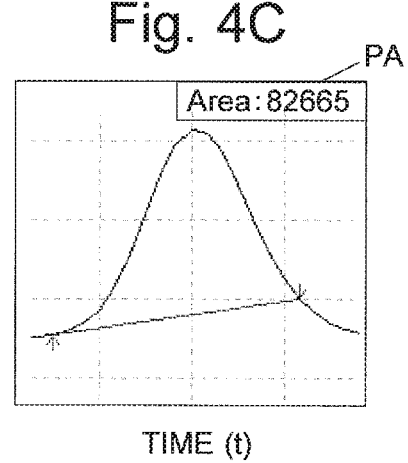

The computed peak area is displayed on the display unit 17 along with the chromatogram (as indicated by numeral "PA" in FIGS. 4B and 4C).

In this manner, in the present embodiment, two points are designated as the candidates of a peak-specifying point based on the operator's selection of a point on the orthogonal coordinate system on which a chromatogram is displayed. Then, one of the two points is selected by the operator, whereby an appropriate peak-specifying point is fixed. Thus, the operation of fixing the peak-specifying points can be easily and efficiently performed.

The present invention is not limited to the configuration of the previously described embodiment but can be appropriately changed.

Figure 5:
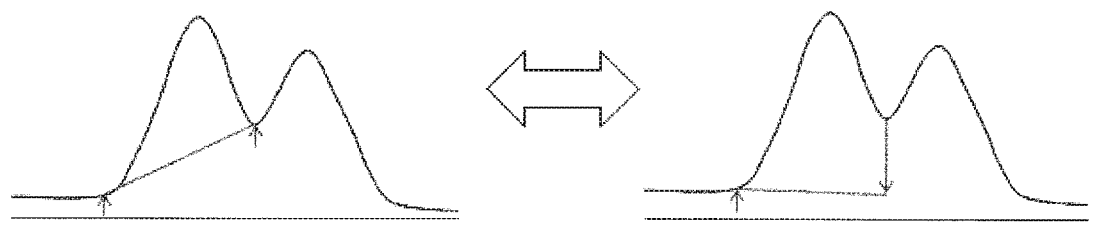
FIG. 5 is a diagram showing an example of the chromatogram with two overlapping peaks displayed on an orthogonal coordinate system formed by a time axis and an intensity axis in the chromatogram data processing device according to the present embodiment.

For example, the waveform analyzer 13 may be configured to automatically detect both peak-beginning and peak-ending points or only one of them based on an instruction from an operator. For example, when there are two peaks overlapping each other as shown in FIG. 5, it is difficult to automatically detect peak-specifying points which are present on the overlapping portion of the two peaks. That is, in the case of the left peak on the chromatogram shown in FIG. 5, while the peak-beginning point can be automatically detected, the peak-ending point is difficult to automatically detect. In the case of the right peak, while the peak-ending point can be automatically detected, the peak-beginning point is difficult to automatically detect. In such cases, it is preferable to locate only one of the peak-beginning and beak-ending points by the automatic detection function, and leave the other one to be manually determined by the operator.

The device may also allow the operator to manually designate, as a peak-specifying point, a point on the straight line L1 passing through the first and second candidates (see FIG. 4A) or a point within the section between the first and second candidates by a predetermined operation. In this case, the operator using the mouse initially moves the cursor to a point on the straight line L1 or a point between the first and second candidates, and subsequently drags the cursor with the mouse button down. At an appropriate point, the operator releases the mouse button to fix the peak-specifying point. While the cursor is being moved to fix the peak-specifying point, the peak area calculator 14 may preferably compute the peak area which continuously changes in real time, and display the calculated value on the display unit 17. This configuration allows the operator to refer to the peak area displayed on the display unit 17 in determining the peak-specifying point.

Furthermore, the device may have a first mode for manually designating, as a peak-specifying point, a point on the straight line L1 passing through the first and second candidates or a point within the section between the first and second candidates, as well as a second mode for selecting one of the first and second candidates, with the first and second modes being switchable by a predetermined operation. Additionally, this device may have a third mode for fixing one of the peak-beginning and peak-ending points by manually indicating a point on the straight line extending parallel to the time axis and passing through the other peak-specifying point after this other peak-specifying point has been fixed, with the first through third modes being switchable by a predetermined operation. The third mode facilitates the task of selecting the positions of the peak-specifying points whose baseline is parallel to the time axis.

The previously described embodiment and its variations are configured to limit the selectable range of the peak-specifying points so that an operator with any degree of skill can easily set the peak-specifying points. Needless to say, the device may additionally be provided with a fourth mode which allows any two points on the orthogonal coordinate system on which the chromatogram is displayed to be freely selected as the peak-beginning and peak-ending points, with the first through fourth modes being switchable by a predetermined operation. Other than the configuration with the first through fourth modes completely provided, a configuration provided with the fourth mode along with one or two of the first through third modes is also possible.

One possible method for switching the mode is to select an icon on a tool bar by operating a mouse or similar device. Another possible method is to switch the mode according to whether or not a specific key (e.g. Shift key) on the keyboard is pressed in the process of indicating a point on the orthogonal coordinate system.

REFERENCE SIGNS LIST

1 . . . Chromatograph
1C . . . Column
1D . . . Detector
1S . . . Sample Introduction Unit
10 . . . Chromatogram Data Processing Device
11 . . . Signal Processor
12 . . . Chromatogram Data Storage Section
13 . . . Waveform Analyzer
14 . . . Peak Area Calculator
15 . . . Chromatogram Display Processor
16 . . . Peak Coordinate Determiner
17 . . . Display Unit
18 . . . Input Unit

The invention claimed is:

1. A chromatogram data processing device, comprising:
a) a chromatogram display section for displaying a chromatogram on an orthogonal coordinate system formed by a time axis and an intensity axis;
b) a peak-specifying point detector for detecting, based on a predetermined criterion, a peak-beginning point on the chromatogram displayed on the orthogonal coordinate system;
c) a peak-specifying point indicator for allowing an operator to indicate a point in time of a peak-ending point on the time axis of the orthogonal coordinate system;
d) a peak-specifying-point candidate designator for designating, as a first candidate and a second candidate of the peak-ending point, a point at which a straight line extending parallel to the intensity axis and passing through the point in time of the peak-ending point indicated by the operator intersects with the chromatogram, and a point at which a straight line extending parallel to the time axis and passing through the peak-beginning point detected by the peak-specifying point detector intersects with the straight line extending parallel to the intensity axis and passing through the point in time of the peak-ending point; and
e) a peak-specifying point selector for allowing an operator to select a candidate from among the first candidate and the second candidate as the peak-ending point.

2. The chromatogram data processing device according to claim 1, wherein the peak-specifying point selector allows an operator to select, as the peak-ending point, a point on the straight line passing through the first candidate and the second candidate.

3. The chromatogram data processing device according to claim 2, further comprising a peak area calculator for calculating a peak area of the chromatogram displayed on the orthogonal coordinate system, based on the peak-beginning point detected by the peak-specifying point detector as well as the peak-ending point selected by the peak-specifying point selector, and for displaying the peak area on the chromatogram display section.

4. The chromatogram data processing device according to claim 1, further comprising a peak area calculator for calculating a peak area of the chromatogram displayed on the orthogonal coordinate system, based on the peak-beginning point detected by the peak-specifying point detector as well as the peak-ending point selected by the peak-specifying point selector, and for displaying the peak area on the chromatogram display section.

5. A chromatogram data processing device, comprising:
a) a chromatogram display section for displaying a chromatogram on an orthogonal coordinate system formed by a time axis and an intensity axis;
b) a peak-specifying point detector for detecting, based on a predetermined criterion, a peak-ending point on the chromatogram displayed on the orthogonal coordinate system;
c) a peak-specifying point indicator for allowing an operator to indicate a point in time of a peak-beginning point on the time axis of the orthogonal coordinate system;
d) a peak-specifying-point candidate designator for designating, as a first candidate and a second candidate of the peak-beginning point, a point at which a straight line extending parallel to the intensity axis and passing through the point in time of the peak-beginning point indicated by the operator intersects with the chromatogram, and a point at which a straight line extending parallel to the time axis and passing through the peak-ending point detected by the peak-specifying point detector intersects with the straight line extending parallel to the intensity axis and passing through the point in time of the peak-beginning point; and
e) a peak-specifying point selector for allowing an operator to select a candidate from among the first candidate and the second candidate as the peak-beginning point.

6. The chromatogram data processing device according to claim 5, wherein the peak-specifying point selector allows an operator to select, as the peak-beginning point, a point on the straight line passing through the first candidate and the second candidate.

7. The chromatogram data processing device according to claim 6, further comprising a peak area calculator for calculating a peak area of the chromatogram displayed on the orthogonal coordinate system, based on the peak-ending point detected by the peak-specifying point detector as well as the peak-beginning point selected by the peak-specifying point selector, and for displaying the peak area on the chromatogram display section.

8. The chromatogram data processing device according to claim 5, further comprising a peak area calculator for calculating a peak area of the chromatogram displayed on the orthogonal coordinate system, based on the peak-ending point detected by the peak-specifying point detector as well as the peak-beginning point selected by the peak-specifying point selector, and for displaying the peak area on the chromatogram display section.

9. A non-transitory computer readable medium recording a chromatogram data processing program for making a computer execute following steps:

a) a chromatogram display step, in which a chromatogram is displayed on an orthogonal coordinate system formed by a time axis and an intensity axis;
b) a peak-specifying point detection step, in which a peak-beginning point on the chromatogram displayed on the orthogonal coordinate system is detected based on a predetermined criterion;
c) a peak-specifying point setting step, in which a point in time of a peak-ending point is set on the time axis of the orthogonal coordinate system based on an input by an operator;
d) a peak-specifying-point candidate designation step, in which a point at which a straight line extending parallel to the intensity axis and passing through the point in time of the peak-ending point intersects with the chromatogram, and a point at which a straight line extending parallel to the time axis and passing through the peak-beginning point intersects with the straight line extending parallel to the intensity axis and passing through the point in time of the peak-ending point, are respectively designated as a first candidate and a second candidate of the peak-ending point; and
e) a peak-ending point fixation step, in which a candidate from among the first candidate and the second candidate is fixed as the peak-ending point, based on an input by an operator.

10. A non-transitory computer readable medium recording a chromatogram data processing program for making a computer execute following steps:

a) a chromatogram display step, in which a chromatogram is displayed on an orthogonal coordinate system formed by a time axis and an intensity axis;
b) a peak-specifying point detection step, in which a peak-ending point on the chromatogram displayed on the orthogonal coordinate system is detected based on a predetermined criterion;
c) a peak-specifying point setting step, in which a point in time of a peak-beginning point is set on the time axis of the orthogonal coordinate system based on an input by an operator;
d) a peak-specifying-point candidate designation step, in which a point at which a straight line extending parallel to the intensity axis and passing through the point in time of the peak-beginning point intersects with the chromatogram, and a point at which a straight line extending parallel to the time axis and passing through the peak-ending point intersects with the straight line extending parallel to the intensity axis and passing through the point in time of the peak-beginning point, are respectively designated as a first candidate and a second candidate of the peak-beginning point; and
e) a peak-beginning point fixation step, in which a candidate from among the first candidate and the second candidate is fixed as the peak-beginning point, based on an input by an operator.

* * * * *